(12) United States Patent
Navarro, Sr.

(10) Patent No.: US 10,150,194 B1
(45) Date of Patent: Dec. 11, 2018

(54) APPARATUS, KIT AND METHOD FOR A TRAM ADAPTER FOR AN ALIGNMENT TOOL

(71) Applicant: Joseph R. Navarro, Sr., Mooresville, NC (US)

(72) Inventor: Joseph R. Navarro, Sr., Mooresville, NC (US)

( * ) Notice: Subject to any disclaimer, the term of this patent is extended or adjusted under 35 U.S.C. 154(b) by 88 days.

(21) Appl. No.: 15/366,731

(22) Filed: Dec. 1, 2016

Related U.S. Application Data

(60) Provisional application No. 62/262,211, filed on Dec. 2, 2015.

(51) Int. Cl.
*B23Q 17/22* (2006.01)
*G01B 5/245* (2006.01)

(52) U.S. Cl.
CPC ....... *B23Q 17/2275* (2013.01); *B23Q 17/225* (2013.01); *G01B 5/245* (2013.01)

(58) Field of Classification Search
CPC ...... B23Q 17/225; B23Q 17/22; G01B 5/245; G01B 3/40
USPC .......................................... 33/638, 645, 613
See application file for complete search history.

(56) References Cited

U.S. PATENT DOCUMENTS

| | | | | |
|---|---|---|---|---|
| 4,406,069 A * | 9/1983 | Clement | ................. | G01B 5/245 33/520 |
| 4,437,803 A * | 3/1984 | Volna | ................. | B23Q 17/2258 33/642 |
| 4,813,152 A * | 3/1989 | Spencer | ............. | B23Q 17/2233 33/638 |
| 6,832,440 B2 * | 12/2004 | Navarro, Sr. | .......... | G01B 5/245 33/626 |
| 7,069,666 B2 * | 7/2006 | Navarro | ................. | B23Q 17/22 33/626 |
| 8,266,810 B2 * | 9/2012 | Gordon | .............. | B23Q 17/2233 33/502 |
| 2004/0025363 A1 * | 2/2004 | Allen | .................... | B23Q 35/102 33/638 |
| 2004/0128849 A1 * | 7/2004 | Navarro, Sr. | ........ | B23Q 17/225 33/638 |
| 2005/0120574 A1 * | 6/2005 | Navarro | ................. | B23Q 17/22 33/638 |
| 2011/0131826 A1 * | 6/2011 | Gordon | .............. | B23Q 17/2233 33/642 |

* cited by examiner

*Primary Examiner* — Yaritza Guadalupe-McCall
(74) *Attorney, Agent, or Firm* — Robert J. Yarbrough; Lipton, Weinberger & Husick

(57) ABSTRACT

A tram adapter apparatus, kit and method is used with an alignment tool to check the alignment of the spindle and the table of a machine tool. The alignment tool has two or more indicators retained in a spaced apart relation to the spindle of the machine tool. A tram adapter body is interposed between the indicator body and the stop of one of the indicators, moving the indicator tip to a retracted position. The other indicator remains in the deployed position and may be used to tram the table of the machine tool to check the alignment between the table and spindle.

20 Claims, 8 Drawing Sheets

APPARATUS, KIT AND METHOD FOR A TRAM ADAPTER FOR AN ALIGNMENT TOOL

I. RELATED APPLICATION

This patent application claims priority from provisional application 62/262,211 by Joseph R. Navarro filed Dec. 2, 2015. That application is hereby incorporated by reference as if set forth in full herein.

II. BACKGROUND OF THE INVENTION

A. Field of the Invention

The Invention is an apparatus, kit and method for tramming the table of a machine tool using an alignment tool. The tram adapter apparatus may be used with the alignment tools taught by U.S. Pat. No. 7,069,666 issued Jul. 4, 2006, U.S. Pat. No. 6,832,440 issued Dec. 21, 2004, both to Joseph Navarro et al, and application Ser. No. 15/231,718 by Joseph Navarro filed Aug. 8, 2016 all of which are incorporated by reference as if set forth in full herein.

The term 'alignment tool' is not limited to the alignment tools of the patents and application referred to above and includes any other tool having one or more indicators using a plunger and that may be attached to the spindle of a machine tool for aligning the spindle to the table of the machine tool. The Invention also may be used to move any indicator having a plunger to a retracted position, regardless of whether the indicator is a part of an alignment tool.

The Invention includes the tram adapter, a kit comprising the alignment tool and a tram adapter, a method for tramming the table of a machine tool, and a method of retaining an indicator plunger in a retracted position using the adapter.

B. Statement of the Related Art

A machinist may make the spindle of a machine tool perpendicular to the table of the machine tool by 'tramming;' that is, by mounting a single indicator to the spindle so that the line of actuation of the indicator tip is generally parallel to the axis of rotation of the spindle and in a spaced-apart relation to the axis of rotation of the spindle. The machinist will advance the spindle towards the table or the table toward the spindle until the indicator tip touches the table and the indicator has a reading. The machinist will then 'sweep' the table by rotating the spindle and by noting the changes to the indicator reading for different angular positions of the spindle. The machinist will adjust the relative angles of the spindle, the table or both until the changes in reading of the indicator as the machinist sweeps the table are within acceptable limits. The spindle is then adequately perpendicular to the table.

Because alignment of the spindle and the table are critical for accurate machining, many machinists prefer to use two different techniques to (a) align the spindle and table and then (b) to check that alignment. The techniques may be drawn from the patents and applications referred to above, to the method described above of tramming the table of the machine tool, or any other method or apparatus known in the art, including the use of alignment tools that incorporate one or more indicators.

III. SUMMARY OF THE INVENTION

The Invention allows a machinist to use two different techniques to (a) align the spindle and table of a machine tool and (b) to check that alignment, all using a single alignment tool.

A first embodiment of the invention is a tram adapter for use with the alignment tools of U.S. Non-Provisional patent application Ser. No. 15/231,718, U.S. Pat. No. 7,069,666, or U.S. Pat. No. 6,832,440. The tram adapter of the Invention allows a user to place one of the indicators of the alignment tool in a retracted position so that the user may tram the table of a machine tool using the other indicator. In one application of the invention, the user may align the table of the machine tool to the spindle of the machine tool using the alignment tool and then check that alignment by retaining one indicator of the alignment tool in the retracted position and tramming the table of the machine tool using the other indicator.

Each of the alignment tools taught by application Ser. No. 15/231,718, by U.S. Pat. No. 7,069,666 or U.S. Pat. No. 6,832,440 may include a pair of indicators, each of which has an indicator tip that protrudes from the bottom side of the alignment tool and that is configured to selectably touch the table of the machine tool or a gauge block or other object on the table of the machine tool. The indicator tip for each indicator is attached to an indicator shaft that extends through the indicator body and protrudes from the top of the indicator body. The upper end of the indicator shaft terminates in a stop, which may be a nut. A spring urges the stop against the indicator body. The stop prevents excessive movement of the indicator shaft and indicator tip in the downward direction. The indicator tip and indicator shaft have a line of actuation that is generally parallel to the axis of rotation of the spindle of the machine tool when the alignment tool is mounted to the spindle of the machine tool. The position of the indicator tip and shaft along the line of actuation defines the reading of the indicator.

The tram adapter of the Invention has a tram adapter body. The tram adapter body has a top side and a bottom side and defines a first thickness between the top side and bottom side. An opening communicates through the tram adapter body between the top and bottom sides. The machinist selectably places the tram adapter body between the stop and the upper side of one of the indicator bodies so that the indicator shaft penetrates the opening and so that the top side of the tram adapter body engages the stop and so that the bottom side of the tram adapter body engages the upper side of the indicator body. The tram adapter body serves as a spacer between the upper side of the indicator body and the stop.

The first thickness of the tram adapter body is selected so that when the machinist places the tram adapter body between the indicator body and the stop, the indicator tip moves from a deployed position to the retracted position. In the deployed position, the indicator tip is extended and is ready to contact the table of the machine tool or an object on the table and is ready to indicate a measurement. In the retracted position, the indicator tip is retracted so that it is out of the way and is not ready to indicate a measurement. The indicator that is in the deployed position extends further from the body of the alignment device than the indicator that is in the retracted position.

To tram the table of a machine tool, the machinist will attach the shank of the alignment tool to the spindle of the machine tool and will retract the indicator shaft and indicator tip of one of the indicators using the tram adapter body as described above. The machinist then may use the other indicator to sweep the table to determine whether the table of the machine tool is adequately perpendicular to the spindle.

As a second embodiment, the Invention is a tram adapter for any alignment tool having two, three or more indicators where the lines of actuation of the indicators are in a spaced apart relation to the spindle of the machine tool when the alignment tool is attached to the spindle. An example of this second embodiment is an alignment tool having two indicators in a spaced-apart relation to the spindle of the machine tool when the alignment tool is attached to the spindle, but that does not include the calibration features taught by application Ser. No. 15/231,718 or U.S. Pat. Nos. 7,069,666 or 6,832,440.

As a third embodiment, the Invention may be used in any application where a user wishes to hold the indicator tip of an indicator in a retracted position, regardless of the location or use of the indicator.

For each of the above embodiments, the tram adapter may take the form of a tram adapter body that may be selectably disposed between the upper portion of the indicator body and the stop on the upper end of the indicator shaft. The opening defined by the tram adapter body may be configured so that the tram adapter body is generally in the shape of a horseshoe, with the opening having a width configured to receive the indicator shaft. The top side of the tram adapter body may include a circumferential lip to retain the tram adapter body in position straddling the indicator shaft and between the indicator body and the stop.

Rather than being an open horseshoe in shape, the tram adapter body may define a closed loop about the opening and the opening may be elongated to define a first end and a second end. The tram adapter body has a first thickness at the first end and a second thickness at the second end. When the closed tram adapter body encircles the indicator shaft at the first end and the first end is disposed between the stop and the indicator body, the indicator tip is in the retracted position. When the closed tram adapter body encircles the indicator shaft at the second end and the second end is disposed between the stop and the indicator body, the indicator tip is in the deployed position. The machinist may selectably move the indicator tip between the deployed and retracted positions by interposing either the second end or the first end between the indicator body and the stop.

When the closed tram adapter encircles the indicator shaft and the second end is disposed between the stop and the indicator body, the indicator tip is in the deployed position. When the indicator tip is in the deployed position, the alignment tool may be used as taught by U.S. Pat. Nos. 7,069,666 and 6,832,440 and by application Ser. No. 15/231,718 to align the table and spindle of the machine tool. When the closed tram adapter encircles the indicator shaft and the first end is disposed between the stop and the indicator body, the indicator tip is in the retracted position and may be used to tram the table of the machine tool, as described above.

The closed tram adapter body may feature a ramp between the first end and the second end to move the indicator shaft and tip between the retracted and not-retracted positions by moving the tram adapter body with respect to the indicator body The bottom side of the tram adapter body may define a curve to correspond to the curved shape of the upper side of the indicator body. The tram adapter body may be selectably closable about the indicator shaft to define the closed tram adapter, as by an interference or snap connection, by a fastener, by an adhesive, or by any other means known in the art for attaching one object to another.

In one application of the Invention, the machinist may use an alignment tool having two or more indicators to align of the spindle and the table of the machine tool using the techniques taught by the patents and application incorporated by reference or as otherwise known in the art. The machinist may then check the alignment of the spindle and table by moving all but one of the indicators to the retracted position using one or more tram adapter bodies and by then sweeping the table using the remaining indicator, as described above.

The tram adapter of the Invention in combination with an alignment tool may define a kit for aligning the spindle and table of a machine tool.

IV. BRIEF DESCRIPTION OF THE DRAWINGS

V. DESCRIPTION OF AN EMBODIMENT

Figure 1:
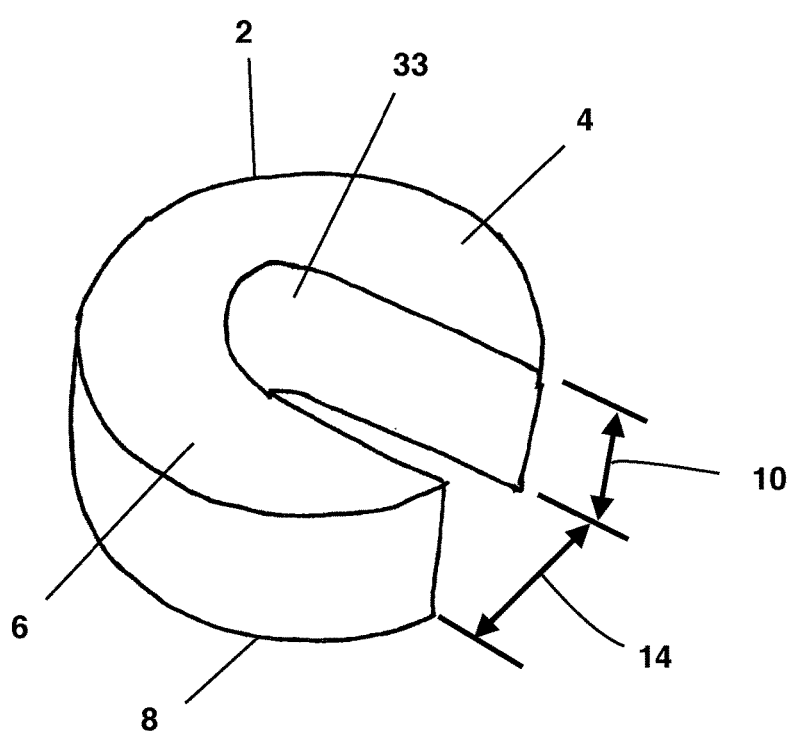
FIG. 1 is a perspective view of the tram adapter body of a first embodiment.

FIG. 1 is a perspective view of one embodiment of the tram adapter body 2. The tram adapter body 2 is generally in the shape of a horseshoe 4. The tram adapter body 2 has a top side 6 and a bottom side 8 and defines a first thickness 10 between the top and bottom sides 6, 8. The tram adapter body 2 defines an opening 12. The opening 12 has a width 14. The width 14 is selected so that the opening will receive an indicator shaft 16.

Figure 2:
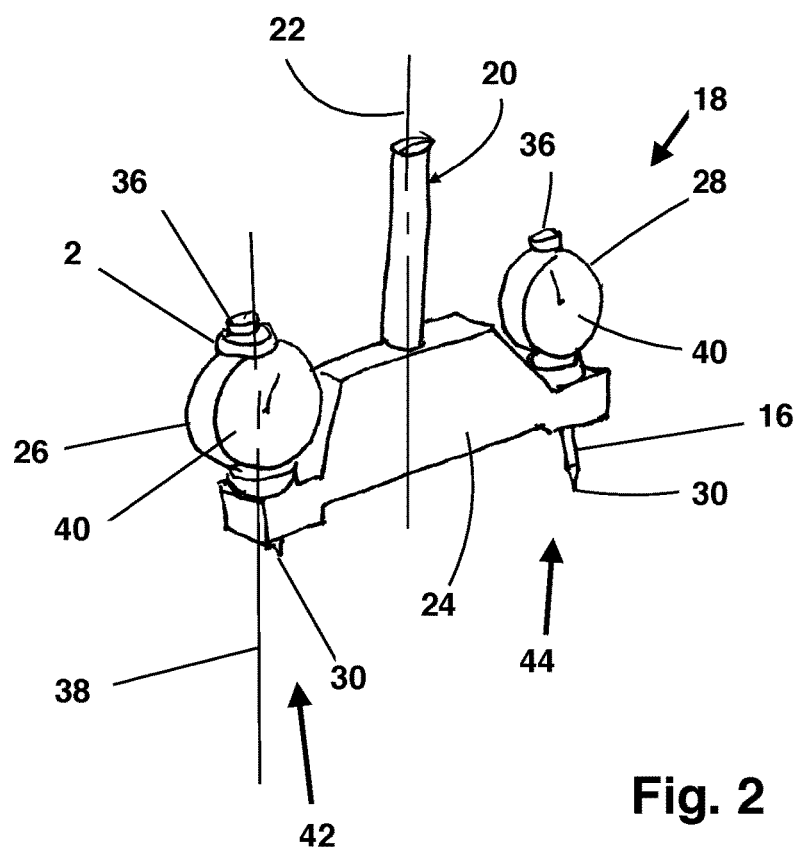
FIG. 2 is a perspective view of the tram adapter body in place on an alignment tool.

FIG. 2 shows the tram adapter body 2 of FIG. 1 in place on an alignment tool 18. The alignment tool 18 features a shank 20 that has a shank longitudinal axis 22. The shank 20 is configured to be attached to the spindle of a machine tool so that the axis of rotation of the spindle is coincident with the longitudinal axis 22 of the alignment tool 18. The alignment tool body 24 supports a first indicator 8 and a second indicator 10 disposed on either side of the shank 20 and in a spaced apart relation to the shank longitudinal axis 22. First and second indicators 8, 10 each has an indicator shaft 16 that is terminated at its lower end by an indicator tip 30. The indicator tips 14 are configured to contact the table of the machine tool when the shank 20 is attached to the spindle of the machine tool and the spindle and table are advanced one toward the other. The indicator tips 14 also may contact a gauge block or other object on the table when the spindle and table are advanced toward each other.

From FIG. 2, the indicator shaft 16 penetrates the first and second indicator bodies 32, 34. The indicator shaft 16 is terminated at its upper end by a stop 36. Each indicator shaft 16 has a line of actuation 38 that is generally parallel to the shank longitudinal axis 22. Indicators 8, 10 may be dial indicators or may be any other indicators that have an indicator shaft 16, indicator tip 30 and stop 36. Movement of the indicator shaft 16 along the line of actuation 38 defines the reading of the indicator 8, 10, which is exhibited by the indicator 8, 10 on the indicator face 40.

Also as shown by FIG. 2, the tram adapter body 2 may be selectably disposed between the indicator body 32, 34 and the stop 36, with the opening 12 of the tram adapter body 2 disposed about the indicator shaft 16. When the first thickness 10 of a tram adapter body 2 is disposed between the stop 36 and the first indicator body 32, but not between stop 36 and second indicator body 34, the indicator tip 30 of the first indicator 26 is raised to the retracted position 42 and the indicator tip 30 of the second indicator 28 remains in the deployed position 44. When the shank 20 is attached to the spindle of the machine tool and the spindle and table are advanced one toward the other, the indicator tip 30 of the second indicator 28 will touch the table before the indicator tip 30 of the first indicator 26. A machinist may advance the table and spindle one toward the other until the indicator tip 30 of the second indicator 28 but not the first indicator 26 touches the table and registers a reading on the indicator face 40. The machinist them may tram the table using the second indicator 28.

The tram adapter body 2 may be selectably disposed to move the indicator tip 30 of the first or second indicator 26, 28 to the retracted position 42. When one of the indicators 8, 10 is moved to the retracted position 40 by the tram adapter body 2, the other indicator 8, 10 remains in the deployed position 44 and may be used to tram the table of the machine tool to determine whether the spindle is adequately perpendicular to the table.

Figure 3:
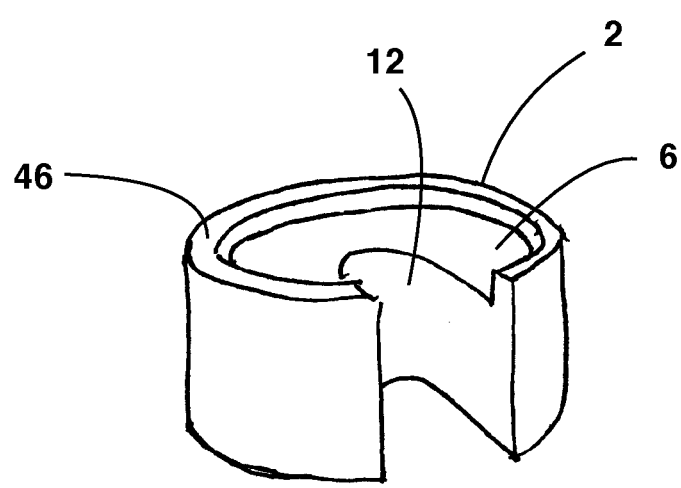
FIG. 3 is a perspective view of the tram adapter body having a lip.

Other configurations of the tram adapter body 2 may be useful. From FIG. 3, the tram adapter body 2 may be equipped with a lip 42. The lip 42 engages the stop 36 and reduces the possibility that the tram adapter body 2 will become disengaged from the indicator shaft 16 when in use.

Figure 4:
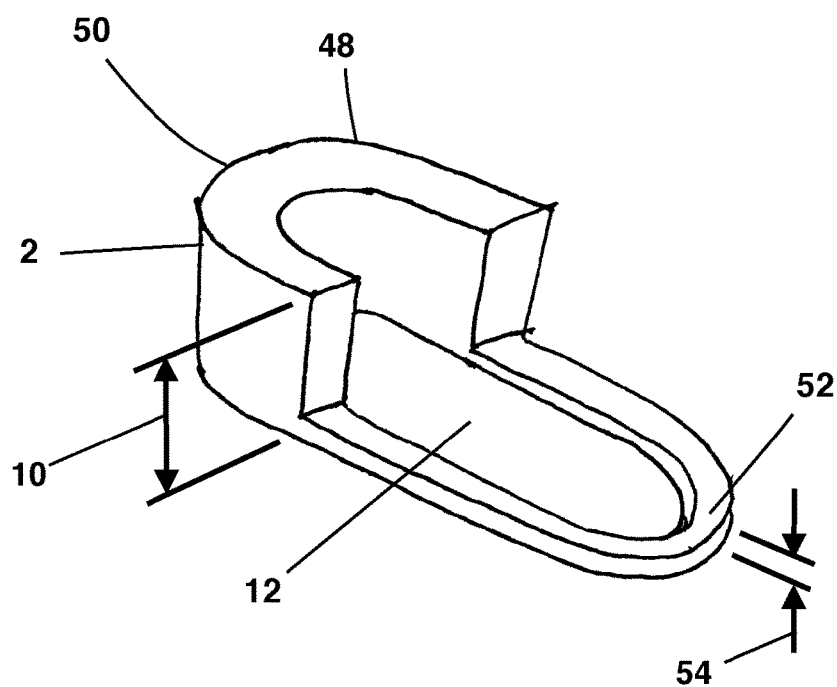
FIG. 4 is a perspective view of a closed tram adapter body having a first end and a second end.

From FIG. 4, the tram adapter body 2 may define a closed loop 48 and may not be in the shape of a horseshoe 4 as shown by FIG. 1. For the closed loop 48 of FIG. 4, the tram adapter body 2 encircles the indicator shaft 16 so that the tram adapter body 2 will not unintentionally disengage from the indicator shaft 16 and so that the tram adapter body 2 may be stored on the alignment tool 18 when the tram adapter body 2 is not in use. The tram adapter body 2 of FIG. 4 has a first end 50 and a second end 52. The first end 50 defines the first thickness 10. The second end 52 defines a second thickness 54. When the first end 50 is disposed between the stop 36 and the indicator body 32 of the first indicator 8, the indicator tip 30 of the first indicator 8 is in the retracted position 42. When the second end 52 of the closed tram adapter 44 is disposed between the stop 36 and the first indicator body 32, the indicator tip 30 of the first indicator 8 is in the deployed position 44. Of course, the tram adapter body 2 defining a closed loop 48 may be used on either the first or second indicator 8, 10.

Figure 5:
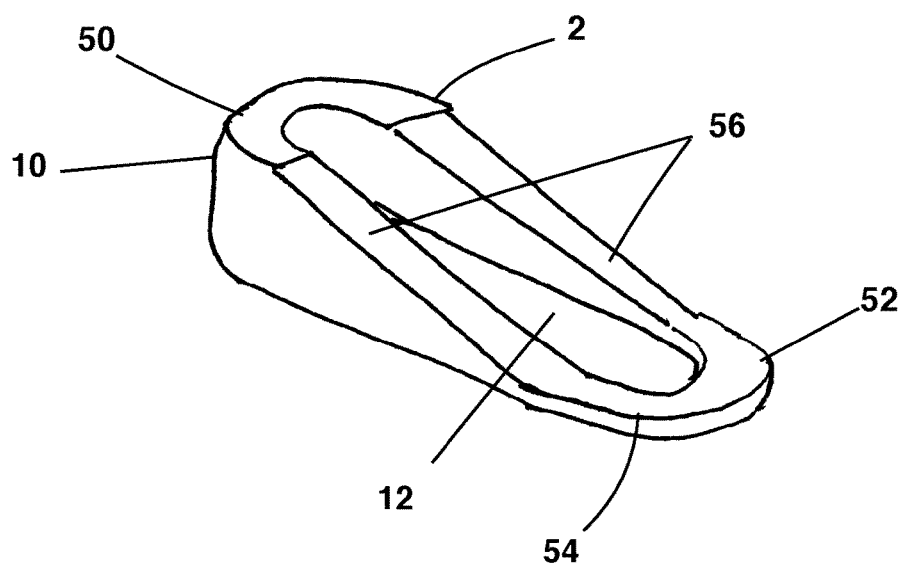
FIG. 5 is a perspective view of a closed tram adapter body featuring a ramp.

From FIG. 5, the tram adapter body 2 defining a closed loop 48 may define a ramp 56 extending between the first end 50 and the second end 52. The embodiment of FIG. 5 operates in the same manner as the embodiment of FIG. 4, except that the presence of the ramp 56 provides the machinist with an easier transition between the retracted and deployed positions 42, 44. The use of the ramp 56 and the closed loop 48 allow the machinist to move an indicator 26, 28 between the retracted and deployed positions 42, 44 using one hand.

Figure 6:
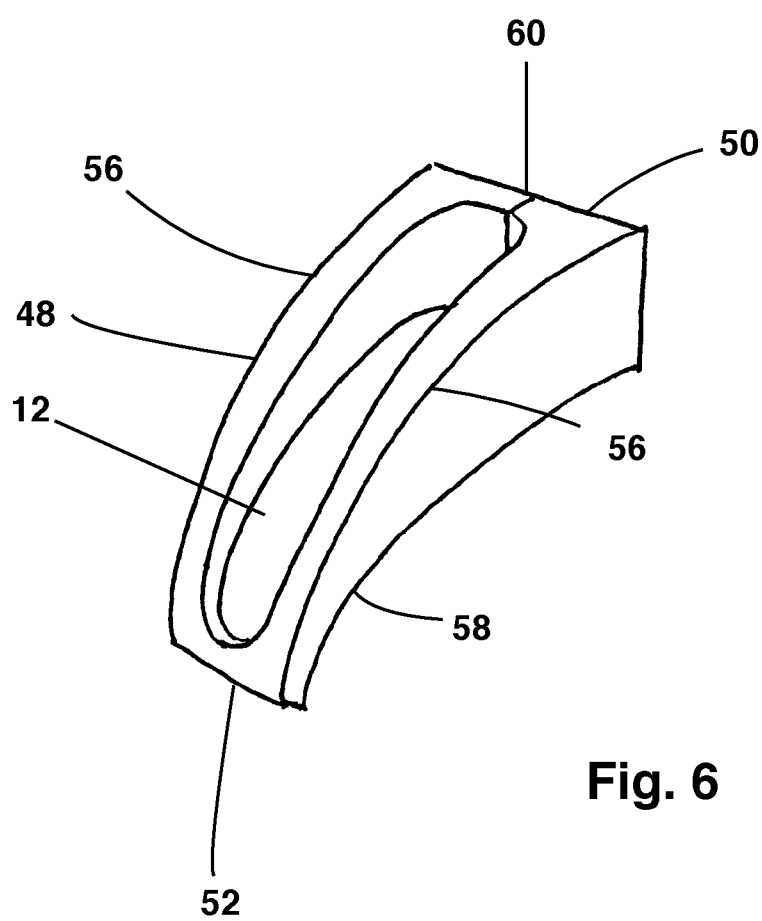
FIG. 6 is a perspective view of a closed tram adapter body defining a curve.
Figure 7:
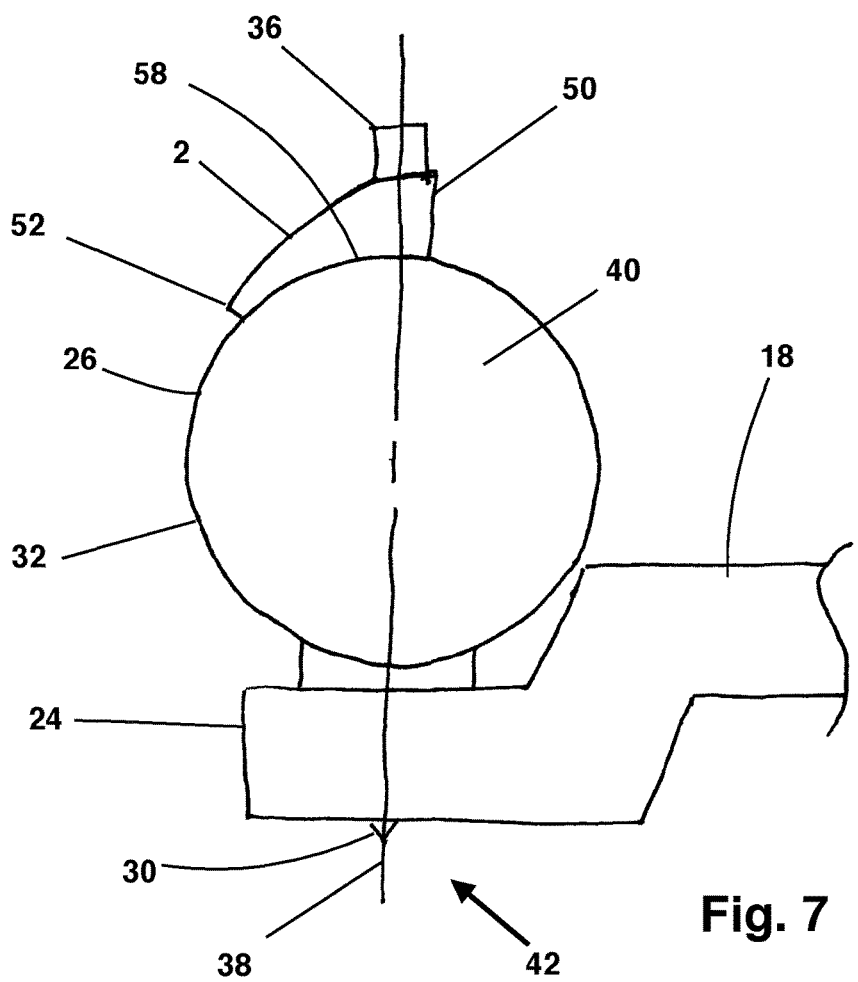
FIG. 7 is a side view of a curved, closed tram adapter body installed on an alignment tool and in the retracted position.
Figure 8:
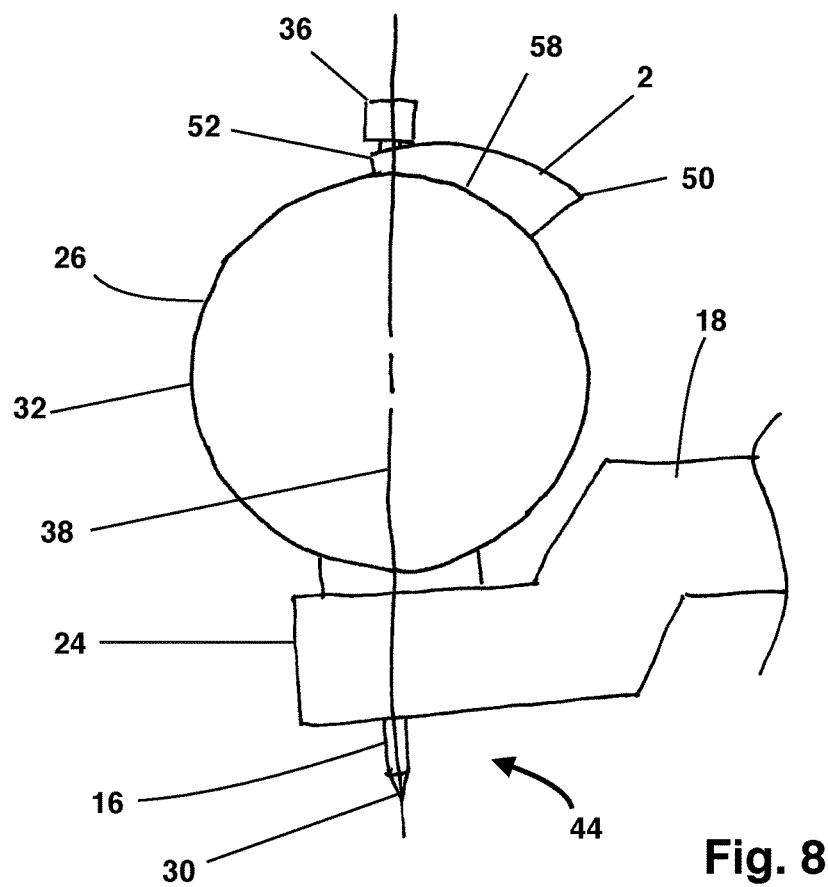
FIG. 8 is a side view of a curved, closed tram adapter body installed on an alignment tool in the deployed position.

FIGS. 6, 7 and 8 illustrate a variant of the embodiment of FIG. 5. As shown by FIG. 6, the tram adapter body 2 in the form of the closed loop 48 may define a curve 58, with the lower side of the curved tram adapter body 2 conforming generally to the curvature of the indicator body 32, 34 and the curvature of the upper side of the tram adapter body 2 defining the ramp 56.

The closed loop 48 may be assembled about the indicator shaft 16 using a closure 60, such as a fastener, a snap or interference fit, an adhesive, or any means known in the art for attaching one object to another.

FIG. 7 illustrates the curved tram adapter body 2 of FIG. 6 installed on the first indicator 8, with the first end 50 of the curved tram adapter body 2 disposed between the stop 36 and the first indicator body 32, which retains the indicator tip 30 in the retracted position 42.

FIG. 8 shows the curved tram adapter body 2 and alignment tool 18 of FIG. 7, but with the indicator tip 30 moved to the deployed position 44 by sliding the curved tram adapter body 2 to the right (clockwise) with respect to the first indicator body 32, so that the second end 52 of the curved tram adapter body 2 is disposed between the stop 36 and the first indicator body 32. Of course, the curved tram adapter body 2 may be oriented for movement in either the clockwise or counter-clockwise direction to move from the retracted position 42 to the deployed position 44. In addition, although FIGS. 7 and 8 illustrate the tram adapter body 2 on the first indicator 26, any tram adapter body 2 may be used with either or both of the first and second indicators 26, 28. Where an alignment tool 18 uses more than two indicators 26, 28, the tram adapter body 2 may be used with any or all of the indicators 26, 28.

The Invention may be a kit comprising an alignment tool 18 and a tram adapter body 2.

The Invention may be a method of tramming a table to a spindle of a machine tool comprising the steps of: (a) attaching a shank 20 of an alignment tool 18 to the spindle of the machine tool, (b) moving one of the indicator tips 30 of the two indicators 8, 10 of the alignment tool 18 to the retracted position 42 by placing a tram adapter body 2 between the stop 36 and the indicator body 32, 34 of the indicator 8, 10, and (c) sweeping the table of the machine tool with the indicator tip 30 of the remaining indicator 8, 10 that is in the deployed position 44. The method of the invention is particularly useful for checking the alignment of the spindle and table of the machine tool where the spindle and table have been aligned using the alignment tool 18. The method allows the alignment to be (a) set, and (b) checked using the same alignment tool 18 and without removing the shank 20 of the alignment tool 18 from spindle of the machine tool.

List of Elements

The following is a list of numbered elements
2 tram adapter body
4 horseshoe
6 a top side
8 a bottom side
10 first thickness
12 opening
14 a width
16 indicator shaft
18 alignment tool
20 shank
22 shank longitudinal axis
24 alignment tool body
26 first indicator
28 second indicator
30 indicator tip
32 first indicator body
34 second indicator body
36 stop
38 line of actuation 40 indicator face
42 retracted position
44 deployed position
46 lip
48 closed loop
50 first end
52 second end
54 second thickness
56 ramp
58 curve
60 closure

I claim:

1. A tram adapter apparatus for use with an alignment tool where the alignment tool includes a shank for attachment of the alignment tool to a spindle of a machine tool and where the alignment tool includes two indicators, each of the indicators having an indicator tip that is urged to an activation position, the indicator tip being attached to a indicator shaft, the indicator shaft extending from an indicator body and terminating in a stop, the tram adapter apparatus comprising: a tram adapter body having a top side and a bottom side, said tram adapter body defining an opening communicating through said tram adapter body from said top side to said bottom side, said opening having a width, said width being selected to receive the indicator shaft, said tram adapter body defining a first thickness between said top side and said bottom side, said first thickness being selected to retain the indicator tip in a retracted position when the indicator shaft is received by said opening and when said bottom side of said tram adapter body engages the indicator body and when said top side of said tram adapter body engages the stop, whereby when the shank is attached to the spindle of the machine tool and the tram adapter body retains the indicator tip of one of the indicators in the retracted position, the other indicator may be used to tram a table of the machine tool.

2. The tram adapter apparatus of claim 1 wherein said top side of said tram adapter body defines a lip, said lip being configured to engage said stop and to resist disengagement between said stop and said top side of said tram adapter body.

3. The tram adapter apparatus of claim 1 wherein said opening communicates with a side of said tram adapter body, whereby said tram adapter body is generally horseshoe-shaped.

4. The tram adapter apparatus of claim 1 wherein said tram adapter body defines a closed loop about said opening.

5. The tram adapter apparatus of claim 4 wherein said closed loop defines a first end and a second end, the tram adapter apparatus being selectably movable between a first position in which the indicator shaft is disposed in said opening at said first end and a second position in which said indicator shaft is disposed in said opening at said second end, said tram adapter body defining said first thickness at said first end, said tram adapter body defining a second thickness at said second end, said first thickness being greater than said second thickness, said second thickness being selected so that the indicator tip is in a deployed position when the indicator shaft is disposed in said opening at said second end, whereby said retracted position and said deployed position of the indicator tip are user-selectable without removing said tram adapter body from said indicator shaft.

6. The tram adapter of claim 5 wherein said opening is sized so that said tram adapter body is retained on said indicator shaft between said indicator body and said stop when said indicator shaft penetrates said opening.

7. The tram adapter apparatus of claim 6 wherein said bottom side of said tram adapter body is curved to conform to said indicator body.

8. The tram adapter apparatus of claim 5 wherein said thickness of said tram adapter body changes between said first end and said second end to define a ramp, whereby a user may move said tram adapter body between said first and second positions by moving said tram adapter body with respect to the indicator body.

9. A tramming kit, the kit comprising:
  a. an alignment tool having a shank, said shank being configured for attachment to a spindle of a machine tool, said alignment tool including a first and a second indicator, said first and second indicators each having an indicator tip, an indicator body, a indicator shaft and a stop, said indicator tip of each said indicator being attached to said indicator shaft of said indicator, each said indicator shaft being movable along a line of actuation, said two lines of actuation being in a spaced-apart relation and generally parallel to a longitudinal axis of said shank, said indicator shaft of each said indicator extending from said indicator body of said indicator and terminating in said stop of said indicator;
  b. a tram adapter body having a top side and a bottom side, said tram adapter body defining an opening communicating through said tram adapter body between said top side and said bottom side, said opening having a width, said width being selected to receive said indicator shaft, said tram adapter body defining a first thickness between said top side and said bottom side, said first thickness being selected to retain said indicator tip in a retracted position when said indicator shaft is received by said opening and said bottom side of said tram adapter body engages said indicator body and said top side of said tram adapter body engages said stop, whereby when said shank is attached to said spindle of said machine tool and said tram adapter body retains said indicator tip of said first indicator in said retracted position, said second indicator may be used to tram a table of said machine tool.

10. The tram adapter apparatus of claim 9 wherein said top side of said tram adapter body defines a lip, said lip being configured to engage said stop and to resist disengagement between said stop and said top side of said tram adapter body.

11. The tram adapter apparatus of claim 9 wherein said opening communicates with a side of said tram adapter body, whereby said tram adapter body is generally horseshoe-shaped.

12. The tram adapter apparatus of claim 9 wherein said tram adapter body defines a closed loop about said opening.

13. The tram adapter apparatus of claim 12 wherein said closed loop defines a first end and a second end, the tram adapter body being selectably movable between a first position in which the indicator shaft is disposed in said opening at said first end and a second position in which said indicator shaft is disposed in said opening at said second end, said tram adapter body defining said first thickness at said first end, said tram adapter body defining a second thickness at said second end, said first thickness being greater than said second thickness, said second thickness being selected so that the indicator tip is in a deployed position when the indicator shaft is disposed in said opening at said second end.

14. The tram adapter of claim 13 wherein said opening is sized so that said tram adapter body is retained on said indicator shaft between said indicator body and said stop when said indicator shaft penetrates said opening.

15. The tram adapter apparatus of claim 13 wherein said thickness of said tram adapter body changes between said first end and said second end to define a ramp, whereby a user may move said tram adapter body between said first and second positions by moving said tram adapter body with respect to said indicator body.

16. The tram adapter apparatus of claim 15 wherein said bottom side of said tram adapter body is curved to conform to said indicator body.

17. A method of tramming a table of a machine tool, the method comprising the steps of:
  a. providing an alignment tool having a shank, said shank being configured for attachment to a spindle of a machine tool, said alignment tool including a first and a second indicator, said first and second indicators each having an indicator tip, an indicator body, a indicator shaft and a stop, said indicator tip of each said indicator being attached to said indicator shaft of said indicator, each said indicator shaft being movable along a line of actuation, said lines of actuation of said two indicator shafts being in a spaced-apart relation and generally parallel to a longitudinal axis of said shank, said indicator shaft of each said indicator extending from said indicator body of said indicator and terminating in said stop of said indicator;
  b. attaching said shank of said alignment tool to a spindle of the machine tool;
  c. retaining said indicator tip of said first indicator in a retracted position utilizing a tram adapter body;
  d. tramming a table of the machine tool with said second indicator.

18. The method of claim 17 wherein said step of retaining said indicator tip of said first indicator in said retracted position comprises:
  a. providing said tram adapter body having a top side and a bottom side, said tram adapter body defining an opening communicating through said tram adapter body between said top side and said bottom side, said opening having a width, said width being selected to receive said indicator shaft, said tram adapter body defining a first thickness between said top side and said bottom side, said first thickness being selected to retain said indicator tip in said retracted position when said indicator shaft is received by said opening and said bottom side of said tram adapter body engages said indicator body and said top side of said tram adapter body engages said stop;
  b. disposing said tram adapter body so that said opening receives said indicator shaft, said bottom side engages said indicator body and said top side engages said stop.

19. The method of claim 18 wherein said step of providing said tram adapter body comprising:
  a. configuring said tram adapter body so that said tram adapter body defines a closed loop about said opening, said closed loop defines a first end and a second end, the tram adapter body being selectably movable between a first position in which the indicator shaft is disposed in said opening at said first end and a second position in which said indicator shaft is disposed in said opening at said second end, said tram adapter body defining said first thickness at said first end, said tram adapter body defining a second thickness at said second end, said first thickness being greater than said second thickness, said second thickness being selected so that the indicator tip is in a deployed position when the indicator shaft is disposed in said opening at said second end;
  b. moving said tram adapter body from said second position to said first position.

20. The method of claim 19 wherein said step of configuring said tram adapter body further comprises: configuring said tram adapter body so that said thickness of said tram adapter body decreases between said first and said second ends to define a ramp, said bottom side of said tram adapter body defining a curve, said curve conforming to said indicator body, whereby said tram adapter body conforms to said indicator body and said indicator tip may be moved generally smoothly between said first and second positions by moving said tram adapter body with respect to said indicator body.

\* \* \* \* \*